United States Patent Office 3,091,513
Patented May 28, 1963

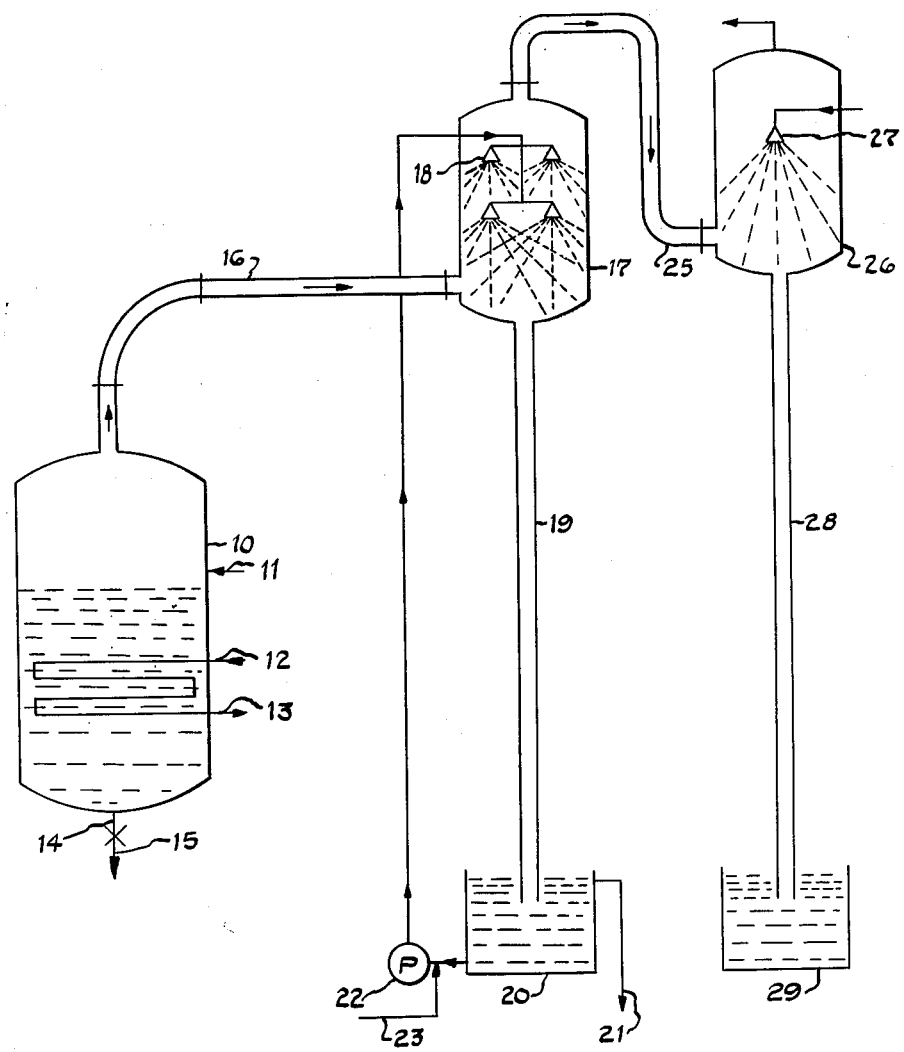

3,091,513
FLUORINE RECOVERY
William R. Parish, Bartow, Fla., assignor to Swift & Company, Chicago, Ill., a corporation of Illinois
Filed Aug. 1, 1960, Ser. No. 46,770
6 Claims. (Cl. 23—153)

This invention relates to the recovery of fluorine from solutions containing fluorine and more particularly to a method for recovering fluorine in a commercially usable form from vapors containing fluorine in the gaseous form.

In the manufacture of superphosphates, ground phosphate rock is treated with a mineral acid such as sulphuric acid to convert certain valuable inorganic materials to the soluble form. The resulting dilute phosphoric acid solution which contains small amounts of fluorine in combined form among other materials is then concentrated to increase the phosphoric acid concentration. During concentration of the phosphoric acid, the fluorine compounds are volatilized probably as $SiF_4$ and $HF$ along with water vapor. In addition to the fact that these materials must be entrapped to avoid contamination of surrounding areas, it is desirable to recover fluorine in a manner which renders recovery thereof economically feasible.

Concentration of phosphoric acid under vacuum as previously practiced involves condensation of fluorine compounds along with water vapor in a barometric condenser. The amount of fluorine in the condensed water is so small that the condensate must be evaporated or flashed to increase the concentration of fluorine in the liquid. This second evaporation step renders recovery of the fluorine compounds economically unattractive and accordingly it has been the practice to neutralize fluorine and discharge the dilute solution to waste.

It is, therefore, an object of this invention to provide a method for recovering fluorine from fluorine containing vapors in an atmosphere at subatmospheric pressure and avoid condensation of water vapors.

Another object of this invention is the provision of a method for treating vapors from the vacuum evaporation of dilute phosphoric acid containing fluorine to recover said fluorine and avoid condensation of excessive amounts of water in the recovery system.

Still another object of the invention is the provision of a method for scrubbing vapors containing fluorine and water vapor in a zone maintained at subatmospheric conditions to selectively separate and remove fluorine from the vapors.

Additional objects, if not specifically set forth herein, will be readily apparent to those skilled in the art from the detailed description which follows:

Generally, the invention is directed to the recovery of fluorine compounds from vapors containing compounds of fluorine together with water vapor. While the process has applicability in various operations where fluorine is volatilized in a vacuum system along with other vapor, it is particularly valuable in entrapping and recovering fluorine from vapors evolved in the vacuum concentration of dilute phosphoric acid. The vapors evolved from the concentrator are treated with a scrubbing liquid under conditions of pressure and temperature which insure substantial absorption of the fluorine compounds by the liquid and a minimum of condensation of the evolved water vapors. It is thus possible to provide a relatively concentrated solution containing fluorine compounds.

More specifically the invention comprises a process wherein the fluorine containing vapors are contacted with a scrubbing liquor such as water or an aqueous solution of fluosilicic acid to absorb fluorine compounds. The temperature of the scrubbing liquor is elevated sufficiently to insure that no appreciable amount of condensation of water vapor takes place, yet the fluorine in the vapors is absorbed by the liquor.

The instant process for fluorine removal during the concentration of dilute phosphoric acid by means of vacuum evaporation involves heating of the dilute acid under a reduced pressure to remove water, and conducting the vapors through a scrubber and thence to a water condenser. In the scrubber the vapors are contacted with warm water or a warm aqueous solution of fluorine compounds, primarily fluosilicic acid. The scrubber liquor is maintained at a temperature above about 25° C. and generally not substantially in excess of 90° C., depending upon the amount of vacuum employed, while the system is maintained under a reduced pressure within the range of about 5 to 29" Hg vacuum. The amount of fluorine in the scrubbing liquor should be less than about 25% fluosilicic acid to obtain good scrubbing efficiency. Use of a vacuum in the range of 5 inches Hg to 29 inches Hg requires that the temperature be maintained in the range of about 25° C.–95° C. A desirable operating temperature of 25° C.–70° C. in the liquid can be effected if the vacuum is maintained around 20–29 inches Hg.

The drawing which is a diagrammatic view of apparatus in which the method of the invention may be carried out will be employed in connection with the explanation of the invention.

In this FIGURE a vacuum evaporating vessel 10 being equipped with an entry port 11 for the introduction of relatively dilute (about 26–32% $P_2O_5$) phosphoric acid and a source of steam into the vessel 12 and a steam condensation exit conduit 13 as well as an exit conduit 14 equipped with a valve 15 for removal of concentrated phosphoric acid is illustrated. The concentrated phosphoric acid contains a reduced amount of fluorine compounds and has a concentration of about 54% $P_2O_5$. At the upper end of the concentrator vessel is a conduit 16 representing a stack which communicates with a scrubber tower 17. As volatile fluorine compounds along with water vapor pass into this scrubber tower, the scrubbing liquor is sprayed into the tower through spray nozzles 18. After absorbing the volatile fluorine material, the scrubbing liquor falls into the barometric leg 19 which is preferably about 34 feet long depending upon the amount of vacuum within the scrubber and the specific gravity of the recycle liquor. The end of the barometric leg is immersed in a seal box 20. The seal box contains water or an aqueous solution of fluosilicic acid. Product ($H_2SiF_6$) overflows the seal box and is pumped to storage 21. The liquor in the seal box is recycled back through the scrubber. A pump 22 is provided for conveying the scrubbing liquor from the seal box into the spray nozzles. Provision is made for adding makeup water at 23 or other suitable location to maintain a fluosilicic acid content of the scrubbing liquor below about 25%. The temperature of the liquor being recycled through the spray nozzles down through the barometric leg and into the seal box is maintained at a level sufficient to insure that at the vacuum under which the system is operated volatile fluorine compounds will be absorbed into the scrubber liquor yet no substantial portion of the water vapor will be condensed.

An outlet from the scrubber tower comprising a conduit 25 leads into a barometric condenser 26. The upper end of this condenser is connected to a suitable source of vacuum (not shown). Those gases which have not been condensed or absorbed are exited at this point. In the barometric condenser a spray nozzle 27 or other source of condensing liquid is provided to condense the water vapors. The temperature and amount of the water entering this condenser is maintained at a level sufficient to insure that water vapor is condensed and passes down through barometric leg 28 to a seal box 29 which is permitted to overflow to waste. This condensate contains only a small portion of fluorine compounds.

It should be understood that the invention also contemplates the use of two or more scrubbers connected in series to obtain greater efficiency of fluorine recovery. It is also possible to connect the scrubbers in parallel where more than one stage evaporation is employed to concentrate the phosphoric acid. It is possible, although best results may not be obtained, to eliminate the seal box. Elimination of the seal box requires that an input line be attached before the recycle pump and a take off line attached to the system after the recycle pump. This modification may be employed when series or parallel scrubbers are used.

In operation, the dilute phosphoric acid solution containing about 26–32% $P_2O_5$ is continuously introduced into the evaporating vessel through the acid inlet and phosphoric acid containing about 54% $P_2O_5$ is continuously withdrawn. Steam is passed into the heating coils to keep the phosphoric acid at the boiling point. A vacuum of about 28″ Hg is maintained in the barometric condenser and slightly less than 28″ Hg vacuum is maintained in the evaporating vessel as a result of the pressure drop through the piping and scrubber. The vapors entering the scrubber are at about 37° C. and are thoroughly washed by the scrubbing liquor emanating from the spray nozzles. Scrubbing liquor is permitted to fall downwardly into the barometric leg and the vapors pass upwardly in the scrubber, permitting a gas liquid contact which is primarily countercurrent in nature.

The evolved vapors are then scrubbed with a scrubbing liquid containing about 15% $H_2SiF_6$ as the liquor is recycled through the scrubber. The temperature of the liquor is slightly below about 37° C., this temperature being controlled in part by the amount and temperature of the make-up water which is added to the fluosilicate solution to maintain a concentration of about 15% $H_2SiF_6$. Another factor affecting the temperature of the recycle liquor is the amount of vacuum applied to the scrubber. In the scrubber about 90–95% of the fluorine contained in the vapors is removed.

The vapors consisting primarily of water vapors, some fluorine compounds and some noncondensables are then passed on to the barometric condenser where a sufficient amount of condensate water held at a temperature of about 30° C. is brought into contact with the vapors. The fluorine compounds and the water vapors are condensed, while the noncondensables are removed from the barometric condenser through the vacuum system.

It should be understood that the operating temperatures noted above are most desirable for a system operated under such vacuum conditions. However, when the amount of vacuum used within the system is changed, the temperature within the system also changes.

Furthermore, if the concentration of $H_2SiF_6$ or fluorine in the recycle liquor becomes too high, that is, greater about 25% $H_2SiF_6$, the vapor pressure of fluorine in the liquor becomes sufficiently great so that the amount of fluorine removed in the scrubber is diminished. Although 5–28% fluosilicic acid in the liquor gives satisfactory results, it is desirable that the recycle liquor contain not substantially in excess of about 25% $H_2SiF_6$ to insure optimum high recovery of fluorine compounds. Thus it is desirable that a balance be maintained between highly concentrated recycle liquor and very dilute recycle liquor so that very large volumes of dilute aqueous solutions need not be handled and, on the other hand, an excessive amount of fluorine will not be lost to the barometric condenser portion of the apparatus. Usually around 13–20% $H_2SiF_6$ in the scrubber liquor will be a desirable concentration to maintain in this liquor.

Although in a specific embodiment of the invention a 15% fluosilicic acid solution is employed as the scrubbing liquor, it should be understood that any liquid-absorbing medium which can be employed to remove fluorine compounds selectively from water vapor is also suitable for use in the process. The scrubbing liquor can be an alkaline solution or in some instances an organic absorbing medium.

Obviously, many modifications and variations of the invention as hereinbefore set forth may be made without departing from the spirit and scope thereof, and accordingly, only such limitations should be imposed as are indicated in the appended claims.

I claim:

1. A process for the recovery of fluorine compounds from vapors produced by the concentration of aqueous phosphoric acid, said vapors containing water vapor and fluorine compounds mainly in the form of HF and $SiF_4$, which comprises: vaporizing constituents of said aqueous phosphoric acid under a vacuum of at least about five inches of mercury to produce vapors containing mainly water and substantial amounts of HF and $SiF_4$, scrubbing said vapors while maintaining said vacuum with an aqueous fluorine-compound-absorbing liquid at an elevated temperature substantially that of said vapors, said aqueous fluorine-compound-absorbing liquid being capable of absorbing said HF and $SiF_4$ so as to form a fluosilicic acid solution having a concentration of at least 5%, whereby the condensation of the water vapor is substantially avoided, and recovering said fluosilicic acid in said aqueous fluorine-compound-absorbing liquid.

2. A process for recovering fluorine compounds from vapors produced by the concentration of aqueous phosphoric acid, said vapors containing water vapor and fluorine compounds mainly in the form of HF and $SiF_4$, which comprises: vaporizing constituents of said aqueous phosphoric acid under a vacuum of about 5 inches of mercury to about 29 inches of mercury to produce vapors containing mainly water and substantial amounts of HF and $SiF_4$, scrubbing said vapors while maintaining said vacuum with an aqueous solution of fluosilicic acid having a concentration of between about 5–28% and having a temperature substantially that of said vapors, whereby the HF and $SiF_4$ are absorbed in said aqueous fluosilicic acid and the condensation of the water is substantially avoided, and recovering the fluosilicic acid solution derived from said fluorine compounds.

3. The process of claim 2 wherein said vacuum is about 20 inches of mercury to about 29 inches of mercury.

4. A method for recovering fluorine compounds from vapors produced by the concentration of aqueous phosphoric acid, said vapors containing water vapor and fluorine compounds mainly in the form of HF and $SiF_4$ which comprises: scrubbing said vapors under a vacuum of at least about 5 inches of mercury with an aqueous solution containing fluosilicic acid of a concentration of at least about 5% at an elevated temperature substantially that of said vapors, whereby the fluorine compounds are absorbed in said fluosilicic acid solution and condensation of the water vapors is substantially avoided, collecting the resulting fluosilicic acid solution, recycling at least a portion of said fluosilicic acid solution to the scrubbing zone, withdrawing a portion of said fluosilicic acid solution, and adding sufficient water to said fluosilicic acid solution to maintain a concentration of fluosilicic acid of about 5–28%.

5. The process of claim 4 wherein the concentration of fluosilicic acid is maintained at about 13–28%.

6. The process of claim 4 wherein the concentration of fluosilicic acid is maintained at about 5–20%.

References Cited in the file of this patent

UNITED STATES PATENTS

| | | |
|---|---|---|
| 2,611,681 | Bellinger | Sept. 23, 1952 |
| 2,917,367 | Hodges et al. | Dec. 15, 1959 |
| 2,933,372 | Manning | Apr. 19, 1960 |